United States Patent
Matsuo

(10) Patent No.: US 11,853,628 B1
(45) Date of Patent: Dec. 26, 2023

(54) INDUSTRIAL PRINTING SYSTEM, PRINT SERVER, AND VARIABLE PRINTING METHOD FOR PEER-TO-PEER DISTRIBUTED PROCESSING OF SECURITY CONTENT IN VARIABLE PRINTING FOR PRODUCTION PRINTING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/119,484

(22) Filed: Mar. 9, 2023

(51) Int. Cl.
  *G06F 3/12* (2006.01)
  *G06K 15/00* (2006.01)
  *G06K 15/02* (2006.01)
  *H04L 69/00* (2022.01)

(52) U.S. Cl.
  CPC .......... *G06F 3/1238* (2013.01); *G06F 3/1222* (2013.01); *G06K 15/1836* (2013.01); *G06K 15/4095* (2013.01); *H04L 69/00* (2013.01)

(58) Field of Classification Search
  None
  See application file for complete search history.

(56) References Cited

U.S. PATENT DOCUMENTS

| | | | |
|---|---|---|---|
| 8,274,679 B2 * | 9/2012 | Tsuchitoi | H04N 1/32128 382/175 |
| 2008/0151288 A1 * | 6/2008 | Matsunoshita | H04N 1/32144 358/1.15 |
| 2011/0013224 A1 * | 1/2011 | Uchida | H04N 1/444 358/1.15 |
| 2015/0156351 A1 | 6/2015 | Yamamoto | |
| 2019/0212957 A1 * | 7/2019 | Mori | H04N 1/44 |

FOREIGN PATENT DOCUMENTS

JP  2015-107555 A  6/2015

* cited by examiner

*Primary Examiner* — Haris Sabah
(74) *Attorney, Agent, or Firm* — Hawaii Patent Services; Nathaniel K. Fedde; Kenton N. Fedde

(57) ABSTRACT

Provided is an industrial printing system that performs distributed processing of security content in peer-to-peer variable printing for production printing. The variable attribute generation unit generates variable attribute information including content information of variable content for which a security level is set in variable data for variable printing. The security determination unit selects other print server capable of processing the variable content based on the security level of the content information of the variable attribute information generated by the variable attribute generation unit. The processing management unit requests the other print server selected by the security determination unit to process the variable content according to the security level.

15 Claims, 7 Drawing Sheets

FIG. 4

```
<variable-data>
    <variable-content>
        <Content Type="Image" ID="IMG001" URL="http://xxxx/xxx/xxx">
            <security-level>High</ security-level>
            <encryption-info>E1F53135E559C253</encryption-info>
            <dummy-data>abc.jpg</dummy-data>
        </Content >
        <Content Type="Image" ID="IMG002" URL="http://xxxx/xxx/xxx">
            <security-level>Middle</ security-level>
            <encryption-info>84B03D034B409D4E</encryption-info>
            <dummy-data>xyz.jpg</dummy-data>
        </Content >
        <Content Type="Image" ID="TXT001">
            <security-level>none</ security-level>
        </Content >
    </variable-content>
    <variable-recode>
        <Record recode-number=1>
            <primary-key>CI-001</ primary-key>
            <pages>
                <start-page>1</start-page>
                <end-page>2</end-page>
            </pages>
            <ContentRef rRef ="IMG001">
        </Record>
        <Record recode-number=2>
            <primary-key>CI-002</ primary-key>
            <pages>
                <start-page>3</start-page>
                <end-page>4</end-page>
            </pages>
            <ContentRef rRef ="IMG002">
        </Record>
        .....
    </variable-recode>
</variable-data>
```

330

340

210

INDUSTRIAL PRINTING SYSTEM, PRINT SERVER, AND VARIABLE PRINTING METHOD FOR PEER-TO-PEER DISTRIBUTED PROCESSING OF SECURITY CONTENT IN VARIABLE PRINTING FOR PRODUCTION PRINTING

BACKGROUND

The present disclosure particularly relates to an industrial printing system, a print server, and a variable printing method that perform variable printing in industrial printing (production printing).

Among print systems that typically include a plurality of printers, there are print systems that perform so-called ubiquitous printing. In the system, when a print system including the plurality of printers (MFPs) receives a ubiquitous job from a PC that issued the job, the first MFP stores the print settings in memory if the print settings can be processed by its own print function, and if it cannot be processed, it is transferred to the next MFP. This processing is performed according to the preset order from the first MFP to the Nth MFP. This saves the ubiquitous job in the memory of the MFP that can process it. As a result, in the printing system, it is possible to reduce the waiting time until the user obtains the printed matter.

That is, in this typical technique, the print data (job) is transferred to each MFP, and it is determined whether or not the transferred MFP itself can process the data.

On the other hand, in industrial printing called production printing by using a commercial (industrial) printing apparatus, the content members of the final product are produced by dividing into a plurality of processes. For example, in the case of bookbinding, covers, body (color), body (black and white), promotional items, bands, shipping envelopes, or the like, are processed as different jobs. Then, in the middle of the process, each job is combined and finished as a book as the final product.

Furthermore, in recent years, variable printing in which output changes for each record has been performed in digital printing of production printing. Variable printing is used for personalized printed matter, and the like. Variable printing is one of the purposes for which printing companies introduce digital production printing apparatuses.

SUMMARY

An industrial printing system of the present disclosure is an industrial printing system having a plurality of print servers and performing variable printing for production printing, each of the plurality of print servers including: a variable attribute generation unit that generates variable attribute information including content information of variable content for which a security level is set in variable data for variable printing; a security determination unit that selects other print server capable of processing the variable content based on the security level of the content information of the variable attribute information generated by the variable attribute generation unit; and a processing management unit that request the other print server selected by the security determination unit to process the variable content according to the security level.

A print server of the present disclosure is a print server for an industrial printing system that performs variable printing for production printing, including: a variable attribute generation unit that generates variable attribute information including content information of variable content for which a security level is set in variable data for variable printing; a security determination unit that selects other print server capable of processing the variable content based on the security level of the content information of the variable attribute information generated by the variable attribute generation unit; and a processing management unit that request the other print server selected by the security determination unit to process the variable content according to the security level.

A variable printing method of the present disclosure is a variable printing method performed by an industrial printing system comprising a plurality of print servers and performing variable printing for production printing, including the steps of: generating variable attribute information including content information of variable content for which a security level is set in the variable data for variable printing; selecting other print server capable of processing the variable content based on the security level of the content information of the generated variable attribute information; and requesting the selected other print server to process the variable content according to the security level.

BRIEF DESCRIPTION OF THE DRAWINGS

FIG. 4 is a conceptual diagram of the variable attribute information as shown in FIG. 3;

DETAILED DESCRIPTION

Embodiment

[Configuration of Industrial Printing System X]

Figure 1:
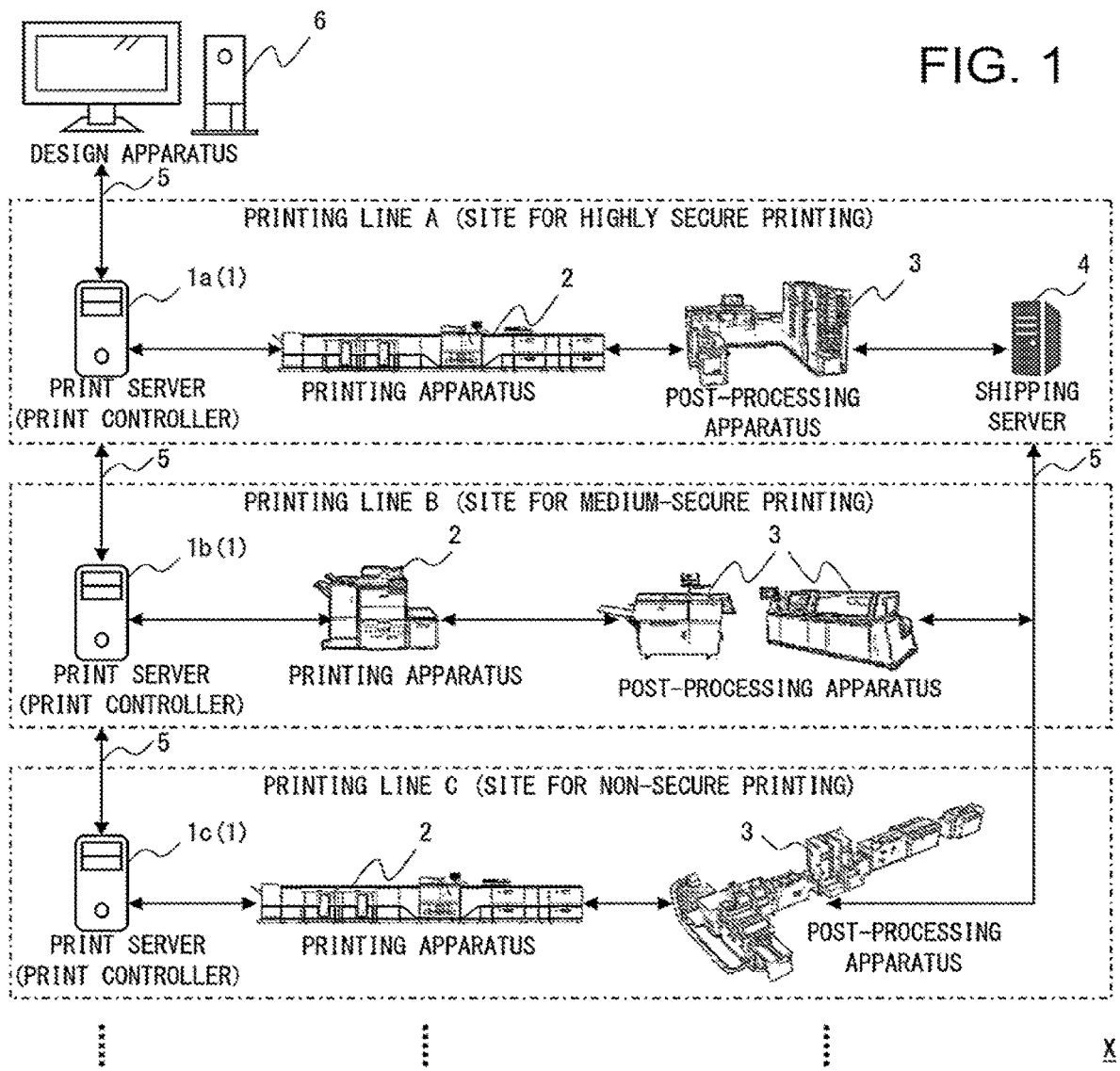
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output in a printing process and a post-processing process (hereinafter also simply referred to as "printing") in industrial printing (production printing).

Here, in the industrial printing system X according to the present embodiment, a final product such as a book to be output is defined as an "order", and each component of the order is defined as a job.

In the industrial printing system X of the present embodiment, as the order, variable document data 200 (FIG. 3) is printed.

In the industrial printing system X, sites (printing lines) are connected with a network 5 and cooperated. The site (printing line) according to the present embodiment includes a printing company, a printing factory, or the like, including a print server 1 and printing-related apparatuses called "component apparatuses" (group) including a printing apparatus 2, a post-processing apparatus 3, a shipping server 4, or the like.

In FIG. 1, as an example of cooperation between sites, print servers 1a, 1b, 1c, ... in printing lines A, B, C, ... and the shipping server 4 of the printing line A are connected via a network 5. Furthermore, in this example, printing apparatuses 2 and post-processing apparatuses 3 are connected to the printing lines A, B, C, .... Hereinafter, anyone of these print servers 1a, 1b, 1c, ... is simply referred to as print server 1.

Here, in the present embodiment, an example that the printing line A is a site for highly secure printing that performs printing with a security level of "high level"; the printing line B is a site for medium secure printing that performs printing with a security level of "medium level" or "low level"; and the printing line C is a site for non-secure printing that performs printing with a security level of "unnecessary" (no security protection required).

Specifically, in the present embodiment, when the security level is "high level", it is possible to print personal information, or the like, which requires special handling. Further, in the case of "middle level", it is possible to print information such as information for specific customers, which does not need to be handled as carefully as in "high level", but which should not be known to other customers. Otherwise, in the case of "low level", it is possible to print information such as trademarks, age-restricted terms, or the like, which should not be seen by the general public, or the like. On the other hand, if it is "unnecessary", the information can be seen and printed by the general public without any problem.

The print server 1 is an information processing apparatus serving as a print controller that manages and controls component apparatuses provided at each site. The print server 1 is configured with a PC (Personal Computer) server, a dedicated machine, a general-purpose machine, or the like.

In the present embodiment, the print server 1 executes dedicated print management (order output management) application software (hereinafter simply referred to as "application"). Thus, the print server 1 performs peer-to-peer distributed processing of the variable document data 200 (FIG. 3) for production printing. The print management application (hereinafter referred to as the "dedicated application") may run on a common platform that provides print design creation, user management, tenant management, security management, maintenance notification service, prepress processing management, storage management of each document, and management of the printing apparatus 2, or the like.

Specifically, in production printing, the print server 1 transmits and receives various instructions and information to and from the printing apparatus 2, the post-processing apparatus 3, the shipping server 4, and the like. As a result, the print server 1 manages the status of each apparatus and requests processing of variable contents of the variable document data 200.

In the present embodiment, the print server 1 is the print server 1 on the requesting side (hereinafter referred to as the "own print server") or the print server 1 on the side of the processing request (hereinafter referred to as the "other print server"). Requests for variable content processing are made between these print servers and other print servers.

The printing apparatus 2 may be an industrial printer including a digital printer, an automated offset printing apparatus, or the like. The printing apparatus 2 is capable of executing processes of printing step es such as small-lot printing, large-volume (multi-lot) offset printing, or the like.

The post-processing apparatus 3 is a post-processing apparatus for executing processes of post-processing step such as folding, collating, bookbinding, cutting, bookbinding, or the like, for recording paper printed by the printing apparatus 2.

The shipping server 4 is a server that manages the shipping of orders sent from each site after the printing step or post-processing step is completed.

In the present embodiment, an example by using the shipping server 4 at the site of the printing line A is described, but the shipping server 4 may be provided at other sites as well.

The network 5 is a LAN (Local Area Network), a wireless LAN (Wi-Fi), a mobile phone network, other WAN (Wide Area Network), an industrial network, a voice telephone network, other dedicated line, or the like. The network 5 can transmit and receive various commands and data to and from each apparatus. Furthermore, between the print server 1 and each component apparatus may also be connected via a LAN, or the like, of the network 5. In addition, the network 5 may be configured with a VPN (Virtual Private Network), or the like.

The design apparatus 6 is an information processing apparatus such as a PC (Personal Computer), a smart phone, a tablet terminal, a PDA (Personal Data Assistant), or the like. The design apparatus 6 can perform design, prepress, and the like, for variable printing in the image forming system X. Specifically, the design apparatus 6 executes a design application for designing variable printing. Further, the design apparatus 6 can also run a prepress application that controls prepress for production printing.

Furthermore, the design apparatus 6 may be connected to another terminal for submission of manuscript, a terminal for design proofreading, or the like, for the design and prepress. In addition, the design device 6 may have a function of a management apparatus that manages when the print server 1 performs a processing request to each apparatus.

Further in addition, a plurality of these apparatuses may exist according to the application, the scale of printing, and the like. Each apparatus can be connected to the print server 1 by various protocols via the network 5, LAN, or the like. Alternatively, the print server 1 and each apparatus may be directly connected by wire using various interfaces.

In addition, each site may have other types of component apparatuses managed by the print server 1.

Furthermore, a terminal used by the administrator and the other user (Hereinafter simply referred to as "user") from inside and outside each site may be connected via the network 5. The terminal may include a terminal for manuscript submission, a terminal for design proofreading, a console for management, and the like.

Thus, each print server 1 and design apparatus 6 can be accessed by a user from a terminal by using a web browser, a terminal, various applications, or the like. As a result, it is possible to design the variable document data 200 (FIG. 3), submit manuscripts, perform prepress processing, acquire variable data 320, manage printing and post-processing, check other progress status, request processing, or the like.

[Control Configuration of Print Server 1]

Figure 2:
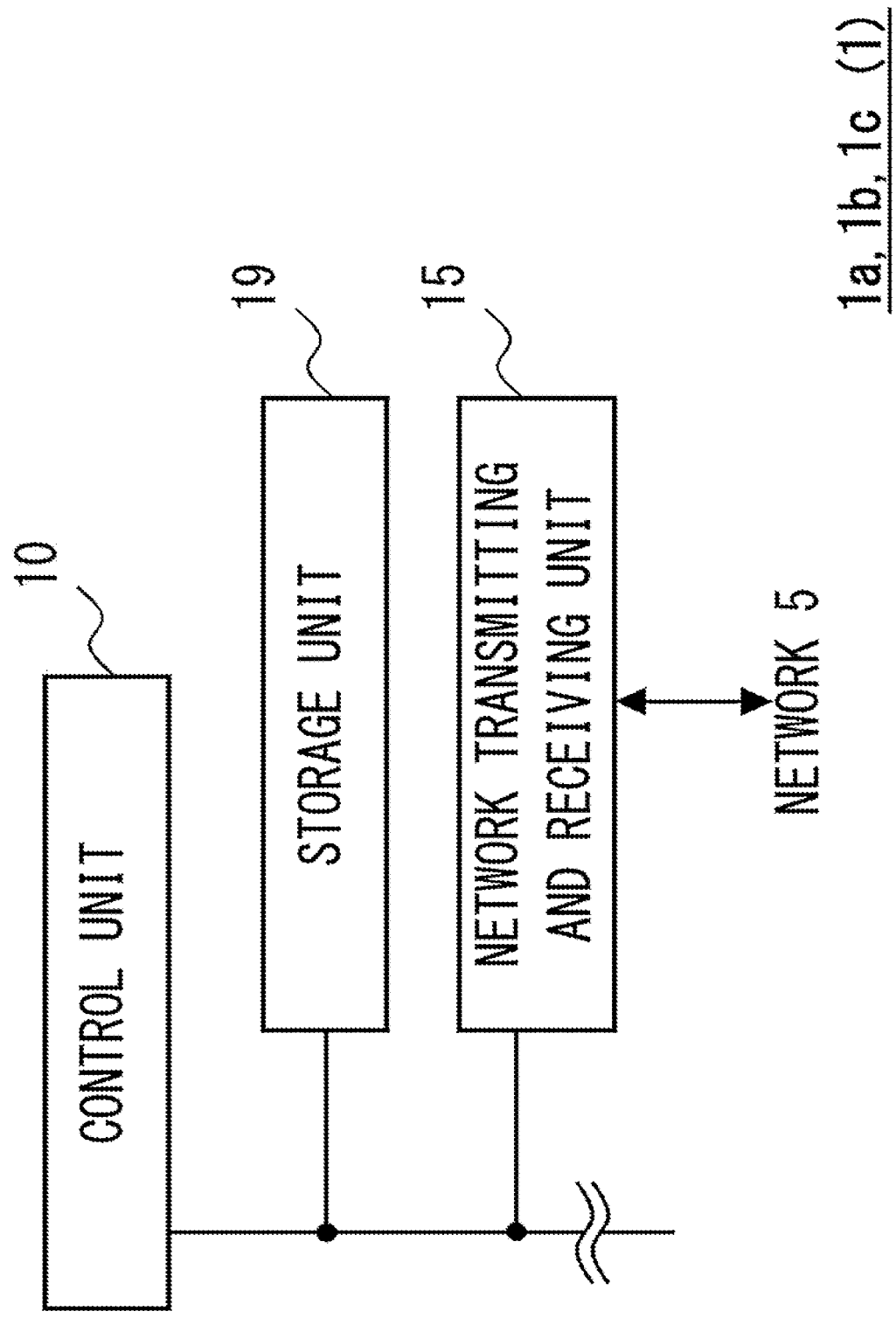
FIG. 2 is a block diagram showing a control configuration of the print server as shown in FIG. 1.

Next, with referring to FIG. 2, a control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 is an information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, that is an application-specific processor), or the like.

The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from the terminal.

The network transmitting and receiving unit 15 is a network connection unit including a LAN board, a wireless transmitting and receiving apparatus, or the like, for connecting to the external network 5.

The network transmitting and receiving unit 15 transmits and receives data through a data communication line, and it transmits and receives voice signals through a voice telephone line.

The storage unit 19 is a non-transitory recording medium including semiconductor memory such as ROM (Read Only Memory) and RAM (Random Access Memory), magnetic storage such as HDD (Hard Disk Drive), and the like.

The control program for controlling the operation of the print server 1 is stored in the ROM or HDD of the storage unit 19. The control program includes an OS (Operating System), middleware on the OS, services (daemons), various applications, database data, other data, key information, and the like. Among these, the various applications include the above-described dedicated application, and the like.

In the present embodiment, the storage unit 19 stores a program and data for processing a raster-in process (hereinafter abbreviated as "rasterize" or "RIP") for converting vector (line drawing) image data into bitmap image data for printing (raster data). This program and data for the rasterizing process also include commercial libraries, fonts, and the like. In addition, the storage unit 19 may also store information, control programs, and the like, for component apparatuses connected with the same printing line.

Furthermore, the storage unit 19 may also store user account settings for the industrial printing system X, other data, and the like.

In addition, in the print server 1, the control unit 10 may be integrally formed, such as a CPU having built-in GPU, chip-on-module package, SOC (System On a Chip), or the like.

Also, the control unit 10 may have built-in RAM, ROM, flash memory, or the like.

[Functional Configuration of Print Server 1]

Figure 3:
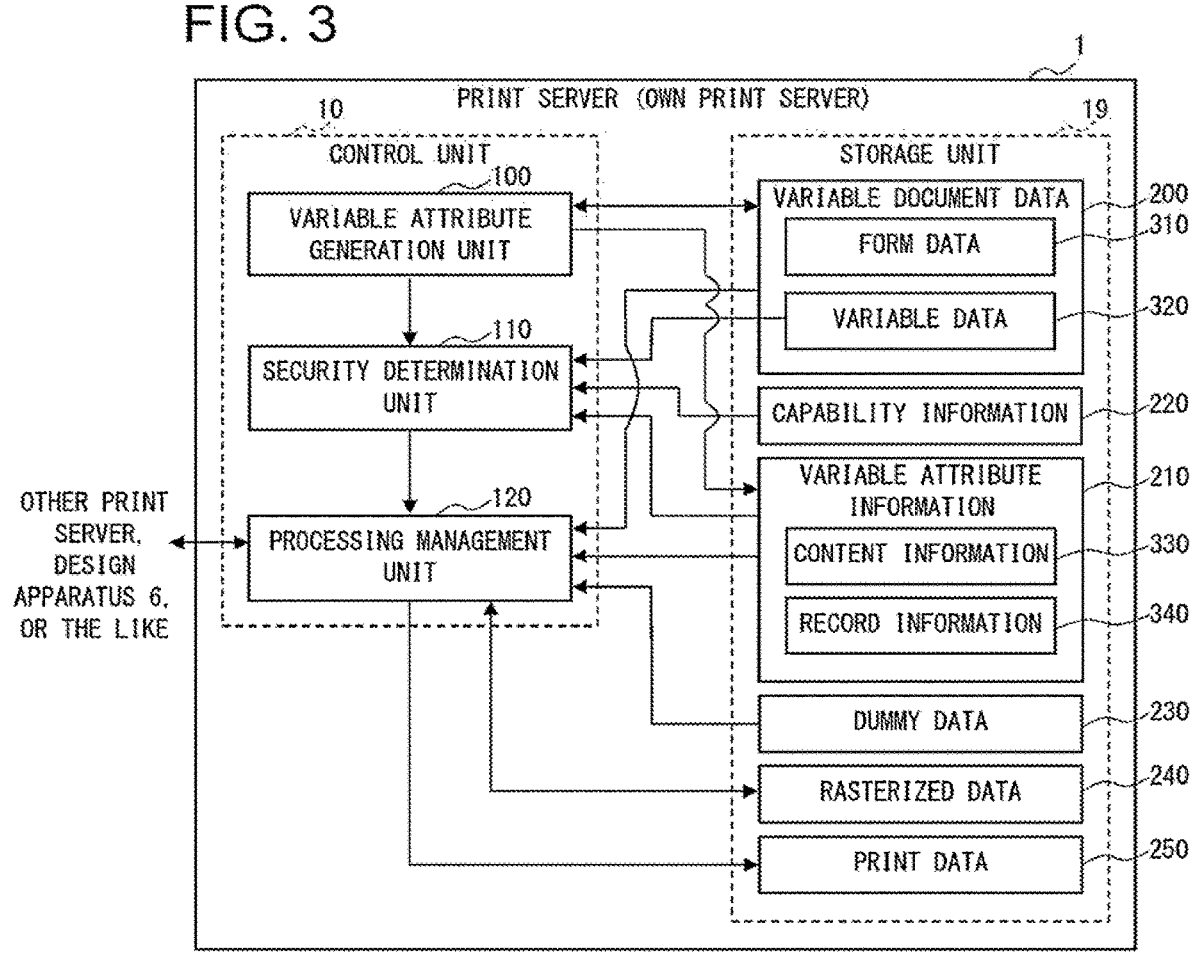
FIG. 3 is a block diagram showing a functional configuration of the print server as shown in FIG. 1.

Here, with reference to FIG. 3, a functional configuration of the print server 1 is described.

The control unit 10 of the print server 1 has a variable attribute generation unit 100, a security determination unit 110, and a process management unit 120.

The storage unit 19 stores variable document data 200, variable attribute information 210, capability information 220, dummy data 230, rasterized data 240, and print data 250.

The variable attribute generation unit 100 generates variable attribute information 210 including content information 330 of variable content (hereinafter also referred to as "security content") for which a security level is set in variable data 320 for variable printing.

The security determination unit 110 selects the other print server capable of processing variable content. The security determination unit 110 perform this selection based on the security level of the content information 330 of the variable attribute information 210 generated by the variable attribute generation unit 100.

The security determination unit 110 determines that processing is to be performed by its own print server when the security level is "high level". On the other hand, the security determination unit 110 selects the other print server when the security level is equal or lower than "middle level", which is lower than "high level".

The security determination unit 110 may encrypt the original data of the variable content whose security level is "high level". At this time, the security determination unit 110 may also encrypt the related variable data 320. Furthermore, the security determination unit 110 can set encrypted information in the encrypted original data and variable data 320.

On the other hand, the security determination unit 110 may designate that the dummy data 230 is to be used for the variable content in which the security level is "high level" at the time of prepress after the creation of the variable data 320, or the like.

Further, if the other print server does not support processing of variable content, the security determination unit 110 can change the security level itself so as to support the processing.

Additionally, the security determination unit 110 may determine the other print server for the content information 330 based on the capability information 220 stored in the storage unit 19.

The processing management unit 120 requests the other print server, which is determined to be processable by the security determination unit 110, to process the variable content according to the security level. Hereinafter, the other print server to which the processing of each variable content is distributed and distributed is also referred to as a "distribution destination."

At this time, the processing management unit 120 transmits the content information 330 to the other print server to request processing. Then, the processing management unit 120 acquires the rasterized data 240 generated by the other print server based on the content information 330. The rasterized data 240 at the time of acquisition may be encrypted with encrypted information. After that, the processing management unit 120 can import the rasterized data 240 into the variable data 320 and perform rasterizing process of each record of the variable document data 200. In this rasterizing process, the process management unit 120 generates print data 250 for each record based on the rasterized data 240 of the variable content.

The processing management unit 120 generates a job ticket including the print data 250, which is generated by the rasterizing process, and transmits it to the other print server to request processing of printing and post-processing.

Alternatively, the processing management unit 120 may cause the printing apparatus 2 in the printing step among the component apparatus managed by the own print server to print the job ticket including the print data 250. The printed matter may be performed post-processing by the post-processing apparatus 3 in the post-processing step.

Furthermore, the processing management unit 120 may create the variable data 320 itself for variable printing in cooperation with the design apparatus 6.

In addition, the processing management unit 120 may instruct prepress or the like.

The variable document data 200 is data of a variable printing job (hereinafter also referred to as a "variable job") in which a variable document used in variable printing and various data related thereto are collected.

The variable document data 200 may be described, for example, in JDF (Job Description Format) and/or JMF (Job Messaging Format).

The details of the variable document data 200 is described later.

The variable attribute information 210 is data including variable contents of the variable data 320 for variable printing and attributes of each record. The variable attribute information 210 is generated as information of each record or content when the variable data 320 is generated.

In the present embodiment, the variable attribute information 210 may be data in a format that is easy to handle as a database similar to the variable data 320 as described later.

The details of the variable attribute information 210 will also be described later.

The capability information 220 is a table, or the like, showing information indicating resources (capabilities) that can be processed by the component apparatuses provided at the sites managed by the print server 1.

In the present embodiment, the capability information 220 mainly stores information about the rasterizing process capability and information about the security level that can be processed by each print server. In particular, in the present embodiment, the capability information 220 of the print server 1a is set to be capable of processing variable content with a security level equal to "high level" or lower. Also, the capability information 220 of the print server 1b is set to be capable of processing variable content with a security level equal to "middle level" or lower. Also, the capability information 220 of the print server 1c is set such that only variable contents with no security level information or "unnecessary" is set to be capable of processing. In this regard, the capability information 220 may also store information, for example, whether or not a private key is held for a public key. Furthermore, this information may also be set in the variable attribute information 210 as information about holding of key information.

In addition, the capability information 220 may include data indicating the specific processing capability of the print server 1 when performing rasterization. For example, the capability information 220 may include color profile information, spot color information, font information, image processing information, plug-in information, and the like. Among these, the color profile information includes information such as an ICC profile. The spot color information includes commercial library information for color designation. The font information includes commercial font information. The image processing information includes information of possible image processing. The plug-in information includes information related to plug-in processing. Furthermore, the capacity information 220 may include information on processing capability of the own site and other sites. This processing capability indicates the capability that can be processed in the printing step and the post-processing step.

The capability information 220 may be shared among the print servers 1. That is, each print server 1 stores in the storage unit 19 the capability information 220 corresponding to each site of a plurality of print servers 1 (group) that can cooperate with each other.

The dummy data 230 is dummy content data that is used instead of the original data of the variable content during prepress, or the like, after the creation of the variable data 320. The dummy data 230 may be characters or images that are different from the original data, have the same size as the original data, and are indicated as "dummy," or the like. Alternatively, as the dummy data 230, data that is different from the content but is similar in hue, character font, or the like, may be used. Alternatively, the dummy data 230 may be data that has undergone low-discrimination processing to make the original data or its rasterized data 240 (Hereinafter simply referred to the "original data") indistinguishable to the user. This low-discrimination process may be mosaicking, lowering the resolution, embedding random or "*" characters, or the like, to the original data.

The rasterized data 240 may be data including image data generated by rasterizing variable content, which is acquired based on the content information 330 by the own print server or the other print server.

Specifically, the rasterized data 240 may be, for example, electronic document data such as PDF (Portable Document Format) including image data (hereinafter simply referred to as "PDF"). The image data in this PDF may be, for example, TIFF or other type bitmap data. Additionally, the image data may be lossless or lossy compressed.

In the present embodiment, if the rasterized data 240 is data for prepress, or the like, the dummy data 230 is rasterized. Otherwise, if the rasterized data 240 is data for actual printing and the security level is equal to "medium level" or higher, or the like, it may be encrypted with the encrypted information of the content information 330.

The print data 250 is data of a print manuscript in which a design is set according to an order. The print data 250 may be, for example, PDF, PS (Postscript) data, other vector data, manuscript format data, other raster image data, and the like. The print data 250 may also be encrypted.

In addition, the storage unit 19 can store public key, private key, and the like for security content. The public key, secret key, or the like, may be obtained from the other print server 1 by using the content information 330 of the variable attribute information 210, as is described later.

Furthermore, in the present embodiment, the storage unit 19 may contain data of distribution conditions regarding job tickets and job distribution. Among these, the job ticket is setting data for requesting a print or post-processing job. This setting includes necessary settings including, for example, imposition position and post-processing. The job tickets may also be written in JDF and/or JMF.

(Details of Variable Document Data 200)

Then, details of the variable document data 200 is described. In the present embodiment, variable document data 200 includes form data 310 and variable data 320. These data may be contained in the variable document data 200 as attribute data.

The form data 310 is data including a common form, or the like, for performing variable printing. This common form becomes data of a part that basically does not change at the time of printing. Specifically, the form data 310 may be data such as PDF (Portable Document Format), PDL (Page Description Language), PPML (Personalized Print Markup Language) in XML (Extensible Markup Language) format, or the like. Among these, the PDF may be PDF/X, which is a subset of the standard PDF defined by the International Organization for Standardization (ISO15930), a simpler PDF, or the like.

Furthermore, the form data 310 may include, for example, image data such as jpg, gif, BMP, PNG, TIFF, other document data, and other data. Additionally, the form data 310 may include layout information that defines the layout or the like on the page. This layout information may include format information such as the position (coordinates) of the form on the page, size, font size of the variable data 320, left alignment, center alignment, and right alignment.

In addition, the form data 310 may also include definitions of the elements of the variable data 320, data describing the items of the elements, data indicating the target of the attributes, and the like. Further, if the form data 310 is data containing security content, it may also contain data such as a "confidential" indication, a watermark, and the like.

The variable data 320 is data for variable output that changes the print content at the time of printing. The variable data 320 may be embedded in the variable document data 200 in, for example, a table format including multiple records, a database format such as XML, or the like.

Alternatively, the variable data 320 may be added separately as a file in a format that is easy to handle as a database. In this case, the variable data 320 may be a database such as a tab-separated or comma-separated file, a spreadsheet application file, other types of database files, a list file, or the like.

In addition, the variable document data 200 may include job type, project (order) name, various types of processing attribute information, print resources, and the like. The processing attribute information may be set the number of copies, whether or not collation is performed, whether or not recording is performed, the number of mm to be cut, the print direction, the print state, the priority order, and the like. Among these, the job type includes a job in the printing step (print job) and a job in the post-processing step (post-processing job). The print resource is information on various resources necessary for printing instructions such as an ICC profile, or the like. The other resource data required for printing are also included in the print resource.

In addition, at least part of the variable document data 200 may be described in a format compatible with JDF and/or JMF.

(Details of Variable Attribute Information 210)

Then, with reference to FIG. 4, the details of the variable attribute information 210 is described.

In the present embodiment, the variable attribute information 210 includes content information 330 of each variable content and record information 340 of each record.

The content information 330 is information on the variable content of the variable data 320 for variable printing. The variable content corresponds to content data of "component" on each page.

Specifically, for example, the content information 330 includes security-related elements such as "content", "security-level", "encryption-info", and "dummy-data" for each object of "component".

The "content" is an element indicating various information of variable content. Specifically, "content" includes "type", "ID", "URL", and the like. Among these, "type" is data indicating the type of variable content. In the present embodiment, "text" and "image" can be set as the type. "ID" is the ID (Identification) of this element. "URL" indicates the location of a file, or the like, as a storage location of the original data of the variable content.

The "security-level" indicates the security level as described above. In the present embodiment, "high level (High)", "middle level (Middle)", and "low level (Low)" can be indicated as the security level. That is, in the present embodiment, variable content whose security level is equal to "low level" or higher becomes security content. On the other hand, as non-security content that is non-confidential, the security level may be set to "unnecessary (None)" to indicate that no security protection is required.

The "encryption-info" indicates encrypted information. The content of this element may include whether or not encryption is used and the key information itself. The key information includes, for example, public key information of a public key, private key information of a private key encrypted with the public key, other information for specifying a key, and the like. This encrypted information may be omitted if the security level is "unnecessary".

The "dummy-data" indicates the file name, file location, or the like, which designate the dummy data 230.

In addition, the content information 330 may include information such as character fonts, color profiles, spot colors, and the like. For spot colors, it is possible to specify colors such as commercial library colors other than normal CMYK (Cyan, Magenta, Yellow, Key plate), or the like.

The record information 340 is information of each record of the variable data 320. That is, the record information 340 includes a record number, a primary key for identifying the record, and processing attribute information of the record in units of records.

Specifically, for example, the record information 340 includes elements such as "record", "pages", and "ContentRef".

The "record" indicates data in units of records. The "record" includes "recode-number" indicating the record number of the variable data 320 as an attribute.

The "primary-key" is the value of the variable data 320 that is the primary key. The primary key is set with a value that can identify a record, such as a customer ID, or the like.

The "pages" indicates the page number including the variable data 320 of the record. For example, pages such as "pages 1 to 10" are designated by "start-page" to "end-page" as the page numbers.

The "ContentRef" indicates the storage location of the variable content. This storage location may indicate a file location or the like, similar to the "URL" of the variable content as described above.

In addition, the record information 340 may include elements such as color information for setting color, monochrome, or spot color, resolution information, and the like. Furthermore, the record information 340 may include information such as an expiration date, a print component (content) ID (content ID), content source data, or the like, as the other processing attribute information.

Furthermore, the record information 340 may include the attributes when the record is rasterized and the rasterized data 240.

Here, the control unit 10 of the print server 1 is caused to function as the variable attribute generation unit 100, the security determination unit 110, and the process management unit 120 by executing the control program stored in the storage unit 19.

Also, each unit of the print server 1 as described above serves as a hardware resource for executing the variable printing method of the present disclosure.

In addition, a part or any combination of the functional configurations as described above may be configured in terms of hardware or circuits by using an IC, programmable logic, FPGA (Field-Programmable Gate Array), or the like.

[Variable Distributed Process by Print Server 1]

Figure 5:
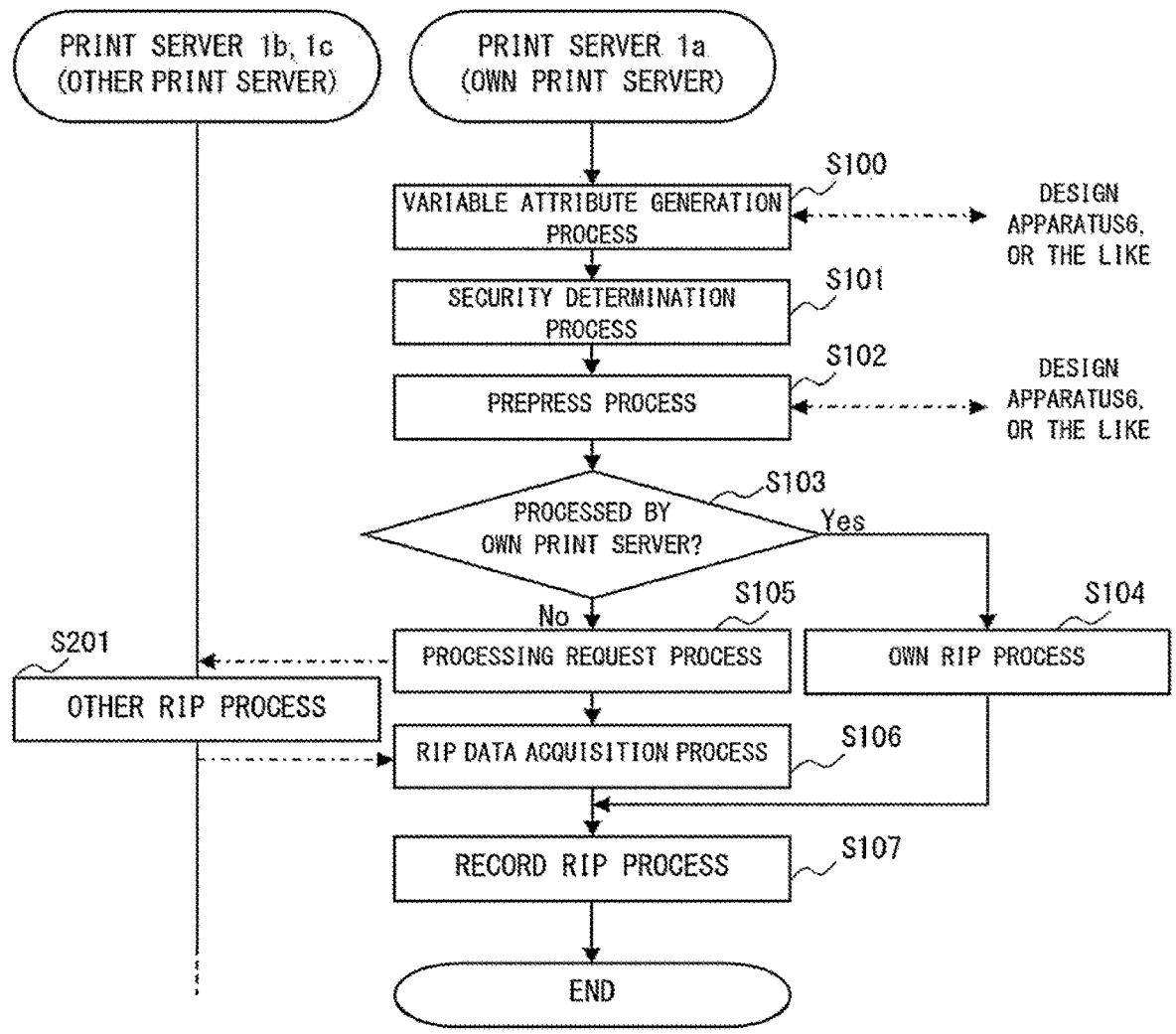
FIG. 5 is a flowchart of variable distributed process according to an embodiment of the present disclosure.
Figure 6:
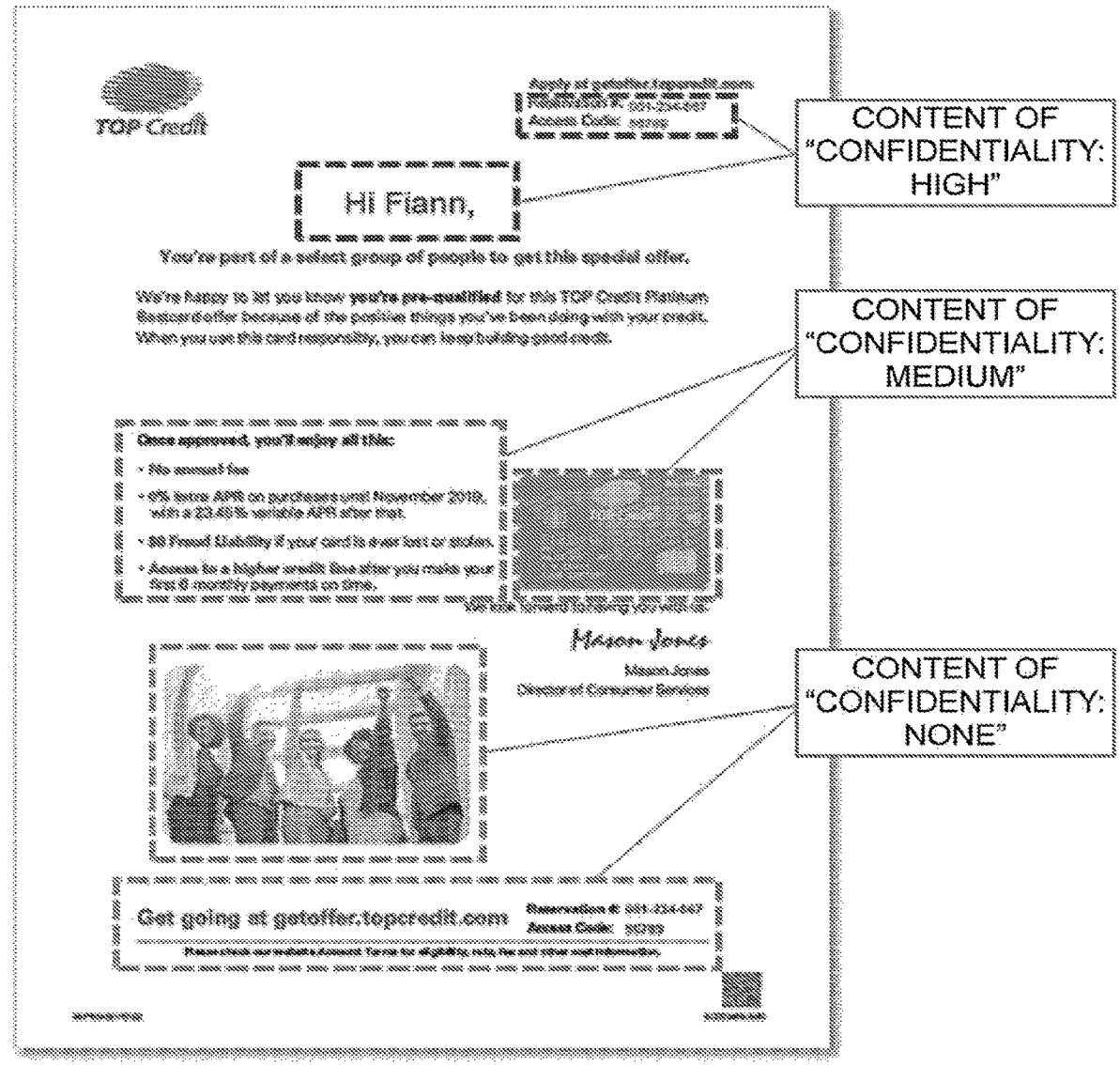
FIG. 6 is a conceptual diagram of variable document data generated by the variable generation attribute process of FIG. 5.
Figure 7:
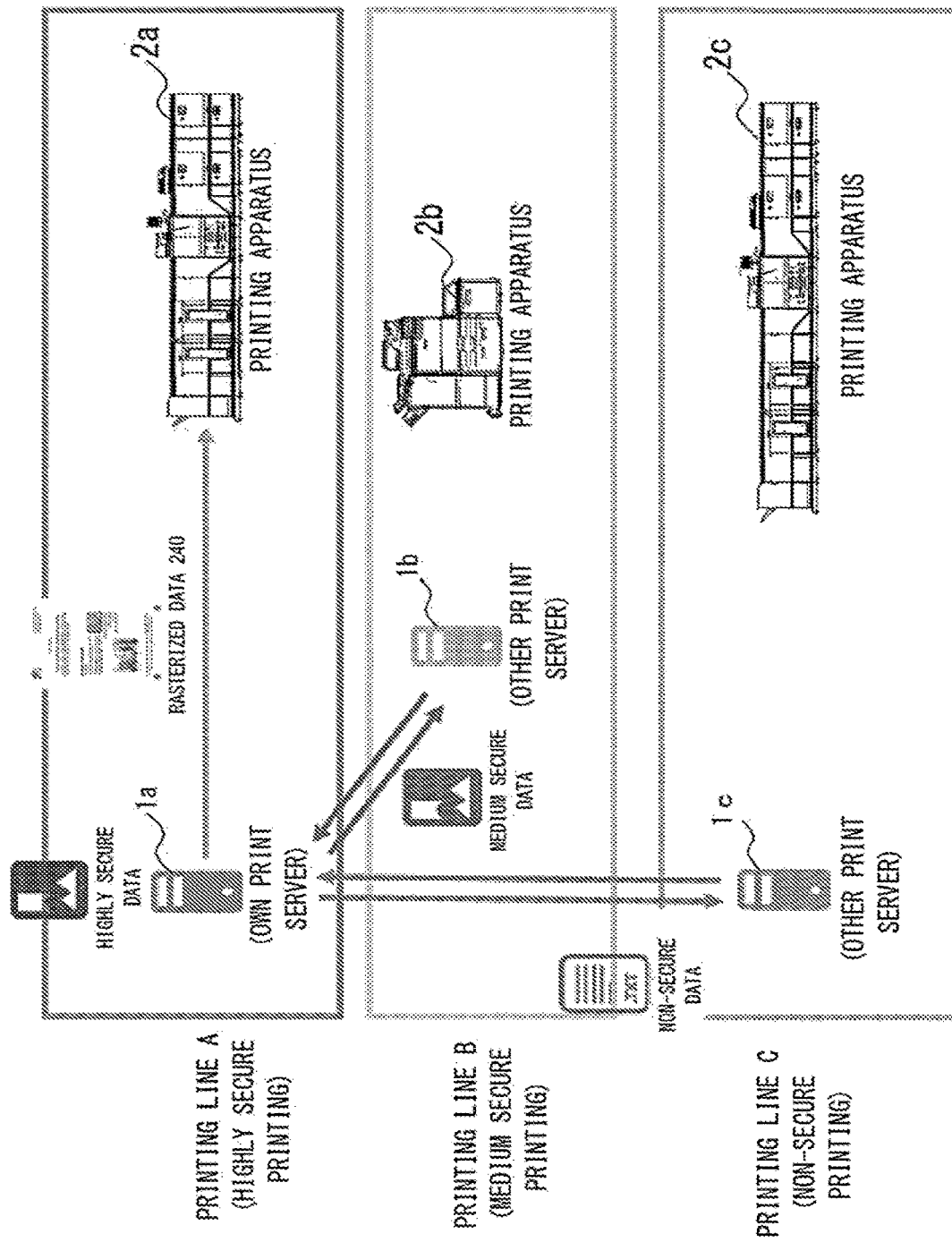
FIG. 7 is a conceptual diagram of the security determination process as shown in FIG. 6.

Next, with reference to FIGS. 5 to 7, a variable distributed process for executing the variable printing method by the print server 1 of the industrial printing system X according to the embodiment of the present disclosure is described.

In the variable distributed process of the present embodiment, variable data 320 for variable printing is created. When creating the variable data 320, variable attribute information 210 including content information 330 of variable content for which a security level is set is generated. Then, based on the security level of the content information 330 of the generated variable attribute information 210, other print server capable of processing variable content is selected. Then, the other selected print server is requested to process the variable contents according to the security level.

In the variable distributed process according to the present embodiment, as a representative example, the print server 1a of the printing line A (site for highly secure printing) is used as the own print server (processing request side), and the control unit 10 of this print server 11a mainly, a program stored in the storage unit 19 is executed in cooperation with each unit using hardware resources.

With reference to the flowchart of FIG. 5, the detail of the variable distributed process is described step by step below.

(Step S100)

Firstly, the variable attribute generation unit 100 performs variable attribute generation process.

The variable attribute generation unit 100 cooperates with the design apparatus 6, and the like, to create variable document data 200 to be subjected to peer-to-peer distributed processing.

The variable document data 200 may be created on the GUI (Graphical User Interface) of the screen of the dedicated application by causing the terminal to run a web browser or a dedicated application by using the template data, or the like. When the variable document data 200 is generated, settings for generating the variable attribute information 210 may also be made.

The variable attribute generation unit 100 generates variable attribute information 210 including content information 330 and record information 340 when acquiring the variable document data 200. The variable attribute generation unit 100 sets a security level in this content information 330.

With reference to FIG. 6, an example of generating such variable document data 200 is described.

In this example, the variable data 320 containing variable content of text or images, which are "confidentiality: high" that includes highly confidential information such as personal information, "confidentiality: medium" that includes information for specific customers, or the like, and "confidentiality: None" that includes information for public and non-confidential.

The variable attribute generation unit 100 sets variable attribute information 210 for each variable content based on the user's designation through the GUI.

Among these, the security level of the variable attribute information 210 to "high level" for the variable content with "confidentiality: high". Similarly, the variable attribute generation unit 100 sets the security level to "medium level" for "confidentiality: medium". Further, the variable attribute generation unit 100 sets the security level to "unnecessary" for "confidentiality: none".

Based on this, the variable attribute generation unit 100 sets whether or not to use encryption and sets the dummy data 230 according to whether it is text or image. In the present embodiment, when the security level is equal to "low level" or higher, encryption may be set to "yes".

(Step S101)

Then, the security determination unit 110 performs security determination process.

Here, the security determination unit 110 encrypts the original data of the variable contents based on the security level. At this time, related variable data 320 may also be encrypted. The security determination unit 110 adds encrypted information to the variable attribute information 210 for this encrypted variable content data.

Furthermore, based on the security level of the content information 330 of the variable attribute information 210, the security determination unit 110 selects the other print server capable of processing the variable content. Specifically, based on the security level and the encrypted information in the variable attribute information 210, the security determination unit 110 selects the print server 1 capable of rasterizing as the other print server. At this time, the security determination unit 110 can determine, for example, whether variable content can be processed based on the capability information 220 acquired from each print server 1 and stored in the storage unit 19.

According to the example of FIG. 7, if the security level is "high level", for example, the security determination unit 110 determines that distributed processing cannot be performed on variable content of "highly secure data" with "confidentiality: high" and determine to perform rasterizing process on the own print server.

On the other hand, the security determination unit 110 selects the print server 1b at the printing line B as the other print server for the variable content of "middle secure data", which the security level is "middle level" with "confidentiality: medium", or the variable content, which the security level is "low level".

Furthermore, if the security level is "unnecessary", for example, for variable contents of "non-secure data" with "confidentiality: none", the security determination unit 110 selects the print server 1c of the printing line C as the other print server.

(Step S102)

Then, the security determination unit 110 performs prepress process.

Here, after the design by the design application is completed and the variable document data 200 is created, the prepress application is started. Then, if the user instructs prepress, the security determination unit 110 can perform prepress.

When the variable data 320 is prepressed, the security determination unit 110 designates the dummy data 230 at least for the variable content whose security level is "high level".

In addition, the security determination unit 110 may select any of the printing lines A, B, and C as the other print server in this prepress regardless of the security level of variable content. In other words, the security determination unit 110 may reselect the print server 1 with less processing load, or the like, as the other print server regardless of the selection in the above-described security determination process.

(Step S103)

Then, the security determination unit 110 determines whether or not the own print server is to process. The security determination unit 110 determines Yes if variable content that the security level is "high-level" is rasterized in the printing process after prepress or if the own print server is selected in the prepress. Otherwise, the security determination unit 110 determines No.

In the case of Yes, security determination unit 110 advances the process to step S104.

In the case of No, the security determination unit 110 advances the process to step S105.

(Step S104)

The processing management unit 120 performs an own RIP process for variable content processed by the own print server.

At the time of prepress, the processing management unit 120 may replace variable content that the security level is equal to "low level" or higher with the dummy data 230.

Alternatively, according to the example of FIG. 7, in the printing process after prepress, the process management unit 120 decrypts the variable content whose security level is "high level" based on the encrypted information.

The processing management unit 120 rasterizes these variable contents and stores them in the storage unit 19 as rasterized data 240.

After that, the processing management unit 120 advances the processing to step S107.

(Step S104)

If the other print server capable of processing is selected, the processing management unit 120 performs processing request process.

The processing management unit 120 requests the other print server, which is determined to be processable by the security determination unit 110, to process the variable content. At this time, the processing management unit 120 transmits the content information 330 of the variable content or the variable attribute information 210 to the selected other print server to request processing.

In the present embodiment, the processing management unit 120 generates a job ticket including the variable content or the content information 330. The variable content or content information 330 may be encrypted.

Then, the processing management unit 120 transmits the job ticket to the other print server selected by the security determination unit 110 to request processing.

(Step S201)

Here, other RIP process executed by the other print server is described.

The control unit 10 of the other print server acquires the job ticket including the content information 330 and processes the variable content.

Specifically, the control unit 10 of the other print server acquires the original data of the variable content from the "URL" portion of the content information 330.

Here, the original data of variable contents of "non-secure data" can be obtained as it is. On the other hand, the encrypted original data may be decrypted based on the encrypted information. Furthermore, if the dummy data 230 is designated for the variable content, this dummy data 230 is acquired.

Then, based on the content information 330, the control unit 10 of the other print server rasterizes the original data or the dummy data 230 by using the program for rasterizing process to generate rasterized data 240.

After that, the control unit 10 of the other print server transmits the generated rasterized data 240 to the own print server. At this time, if the security level is equal to "low level" or higher and the variable content is not the dummy data 230, the control unit 10 of the other print server may encrypt the generated rasterized data 240 with the public key included in the public key information of the encryption information of the content information 330 and transmit it.

(Step S106)

Again, processing by the own print server is explained. Here, the process management unit 120 of the own print server of the requesting side performs the RIP data acquisition process.

The processing management unit 120 acquires the rasterized data 240 generated by the other print server based on the content information 330 and stores it in the storage unit 19.

(Step S107)

Here, the processing management unit 120 performs record RIP process.

When all the variable contents are prepared, the processing management unit 120 imports the rasterized data 240 of the variable content into the variable data 320 for each record of the variable document data 200, and it performs rasterizing process. The rasterized data 240 of the variable content is data performed rasterizing process by the other print server or the own print server.

As a result, the processing management unit 120 generates print data 250 for each record.

Then, the processing management unit 120 generates a job ticket including the print data 250 and causes it to be processed by its own print server or a component apparatus of the other print server.

When the job type is the print job, the processing management unit 120 instructs the selected printing apparatus 2 to print the record included in the job ticket. As a result, the printing apparatus 2 can print out each record of the variable document data 200. At this time, the processing management unit 120 may encrypt the print data 250 having records including variable content whose security level is "high level" and transmit the encrypted print data 250 to the printing apparatus 2.

In the case of a post-processing job, the processing management unit 120 causes the post-processing apparatus 3 to perform post-processing. As a result, post-processing can also be performed by the post-processing apparatus 3.

During prepress, the processing management unit 120 performs various adjustments of printing and post-processing based on the printing result of the printed material and the processing result of post-processing. At this time, the user may instruct various adjustments by using the GUI of the prepress application of the design apparatus 6. The processing management unit 120 acquires this instruction and adjusts the nombre, header, footer, cutting position, cutting width, staple position, and the like. Note that these adjustments may be performed by using the printing apparatus 2 and the post-processing apparatus 3 as well.

With the above, the variable distributed process according to the embodiment of the present disclosure completes.

As configured in this way, the following effects can be obtained.

In typical production printing, there is a case where a plurality of printing apparatuses distributes and processes printing in order to process a large amount of printing in a short period of time. Such distributed processing requires a management server that transmits and manages the print data 250 to a plurality of printing apparatuses 2.

In other words, with typical technology, it was necessary to provide a system for distributed processing centered on the management server.

On the other hand, variable printing is the most characteristic digital printing job, and one of the purposes for which printing companies introduce digital production printing apparatuses. Since variable printing is used for personalized printed matter and the like, it is often the case that a large amount of printing is required.

In such variable data for variable printing, variable contents such as text and images are sometimes added. These variable contents often include highly confidential information such as personal information, information for specific customers, and the like. In order to process such highly confidential printed materials, printing companies are taking measures in their work processes and systems, such as acquiring ISO27001 certification and complying with GDPR. Alternatively, print processing is performed by providing a secure printing line according to the confidentiality level, such as by providing an isolated dedicated printing line.

When printing such highly confidential printed matter, there has been a technical problem in that the concentration of jobs on the limited secure printing line reduces the overall productivity.

On the other hand, the industrial printing system X according to the present embodiment is an industrial printing system having a plurality of print servers 1 and performing variable printing for production printing, each of the plurality of print servers 1 including: a variable attribute generation unit 100 that generates variable attribute information 210 including content information 330 of variable content for which a security level is set in variable data 320 for variable printing; a security determination unit 110 that selects other print server capable of processing the variable content based on the security level of the content information 330 of the variable attribute information 210 generated by the variable attribute generation unit 100; and a processing management unit 120 that request the other print server selected by the security determination unit 110 to process the variable content according to the security level.

By configuring in this way, it is possible to increase the throughput by appropriately performing distributed processing for printing of a variable job including highly confidential variable content.

Specifically, for variable content that can be processed by a print server other than the print server 1 of one secure printing line, the processing load on the secure printing line can be reduced by using the other print server that is distributed and linked. That is, distributed processing can be flexibly performed according to the security level of variable content. As a result, the concentration of job processing on the secure printing line can be reduced, and the throughput of the entire printing can be improved.

Furthermore, a management server for distributed processing is not required, and each other of the print servers 1 can flexibly perform peer-to-peer distributed processing and efficiently distribute and print. That is, in the industrial printing system X according to the present embodiment, there is no need to separately prepare a special management server for distributed processing of the variable document data 200.

In the industrial printing system X according to the present embodiment, the security determination unit 110 selects the other print server when the security level is equal or lower than "middle level" that is lower than "high level". With this configuration, if the security level is "high level", processing is performed by the own print server in the highly secure printing line. Also, if the security level is lower than that, distributed processing of the variable contents can be performed according to the security level. Therefore, the print server 1 can be appropriately selected according to the difference in the security level of the security content, and safe printing can be realized.

In the industrial printing system X according to the present embodiment, the security determination unit 110 designates dummy data 230 to be used for the variable content in which the security level is "high level" at the time of prepress for the variable data 320.

By configuring in this way, by setting dummy data for variable contents where the security level is "high level", information leakage during processes before printing such as prepress can be prevented.

In the industrial printing system X according to the present embodiment, the content information 330 of variable content where the security level is "high level" includes encrypted information, and the processing management unit 120 causes the other print server to process the variable content based on the encrypted information.

By configuring in this way, the original data of the variable contents, and the like, can be encrypted, and information leakage can be prevented. Therefore, printing can be performed more safely on the other print server. In other words, even variable content that has only be processed on a highly secure printing line with typical technology can be safely processed by the other print server according to the present embodiments. Therefore, the efficiency of processing variable content can be improved as a whole.

In the industrial printing system X according to the present embodiment, the processing management unit 120 transmits the content information 330 to the other print server to request processing, acquires rasterized data 240 generated by the other print server based on the content information 330 and encrypted with the encrypted information, and performs rasterizing process by importing the rasterized data 240 into the variable data 320.

With this configuration, the rasterized data 240 can be safely acquired from the other print server, and the print data 250 including variable content can be generated and printed by the own print server regardless of the security level. As a result, peer-to-peer, efficient distributed processing can be performed without going through a management server.

Other Embodiments

In addition, in the above-described embodiment, the private key information is provided from the beginning in the other print server.

However, it is also possible to include the private key information in the encrypted information and send it to the other print server. At this time, it is possible to set such that a unique secret key is generated for each ID of the variable document data 200, transmitted, and discarded after the rasterizing process, or the like.

By configuring in this way, the complexity of private key management can be reduced, and security content can be printed more safely.

Also, in the above-described embodiment, an example of using the highly secure printing line to the non-secure printing line has been described.

However, a low-secure printing site dedicated for the "low level" in the security level may be separately provided. In this case, only the content information 330 and the rasterized data 240 may be encrypted.

Further, it may be possible to dynamically change the security measures of the printing line depending on the presence or absence of the secret key. In this case, the private key information may be transmitted to the other print server and stored in the print server 1 after taking measures similar to the acquisition of the authentication as described above.

By configuring in this way, it is possible to flexibly change the printing line and improve the printing efficiency. It also becomes possible to use the non-secure printing line in the same way as the medium-high secure printing line. In addition, even if it is not a highly secure printing line, highly confidential variable content can be requested processing.

Further, in the above-described embodiment, an example in which the dummy data 230 is used to request process to the other print server from the beginning when the dummy data 230 is designated as the variable content in the prepress, or the like, has been described.

However, even if the dummy data 230 is designated, a normal original data may be rasterized by the other print server, and the rasterized data 240 may be acquired by the own print server. Even in this case, encrypted data may be sent and received. Furthermore, in this case, the processing management unit 120 may replace the rasterized data 240 obtained from the other print server with the dummy data 230. At this time, the processing management unit 120 may perform a low-discrimination processing to make the rasterized data 240 indistinguishable to the user and generate the dummy data 230.

With this configuration, it is possible to replace the dummy data 230 with that of more appropriate and closer to the actual printed matter. Therefore, it is possible to improve the working efficiency of the prepress.

Also, in the above-described embodiment, an example has been described in which the own print server selects the other print server according to the security level.

However, it is also possible to inquire about the security level of a plurality of print servers 1 other than the own print server and select the print server 1 corresponding to this as the other print server. In this case, a command may be sent by broadcast the plurality of print servers 1 to inquire about the availability of processing according to the security level, and the print servers 1 whose reply met the criteria may be selected as the other print server.

By configuring in this way, it becomes possible to determine and select an appropriate other print server without sharing information about whether or not the security level of the other print server 1 can process.

Also, in the above-described embodiment, an example of determining the other print server based on the security level has been described.

However, the security determination unit 110 may also consider the schedule, performance, cost, and other requirements of the plurality of print servers 1 to determine the other print server. In addition, the security determination unit 110 can also consider the other factors such as the number of variable contents to be requested and the delay of the network 5 at the time of selection, or the like.

Further, in the above-described embodiment, an example of including the content information 330 in the job ticket and requesting the other print server to process the job ticket has been described.

However, it is also possible to send the content information 330 itself directly to the other print server to request processing. At this time, the own print server can also obtain the processed rasterized data 240 directly from the other print server.

Furthermore, in the above-described embodiment, only the storage location of the original data of the variable contents is designated to the other print server.

However, it is also possible to send the original data itself from the own print server to the other print server to request processing. In the case of these processing requests, each data may be encrypted as appropriate.

By configuring in this way, it becomes possible to deal with a more flexible configuration.

Furthermore, the security determination unit 110 may be capable of scheduling execution of rasterizing process in the selected other print server. In this case, scheduling by setting the priority for each variable content can be performed.

Also, if there is an error in the rasterizing process or the quality is degraded in the other print server, it is possible to acquire this process result and select the other print server again.

By configuring in this way, it is possible to determine a more appropriate other print server. As a result, it is possible to reduce the time and effort of manual adjustment, improve processing efficiency, and reduce running costs. Further, by requesting processing based on the schedule, it is possible to adjust processing requests due to delays and the like.

In addition, it is also possible to change the processing to be done on the own print server or to change the processing request itself according to the result of the process or the schedule change, or the like, in the other print server. Specifically, for example, the number of variable contents to request processing, the number of pages, the color profile to be used, or the like, can be changed in the case of delay, change in the security level, or the like.

By configuring in this way, even if trouble occurs, the job can be performed by distributed processing.

In addition, the security determination unit 110 does not always select one print server 1 as the other print server to be distributed to, but it can select a plurality of the appropriate print servers 1.

In this case, it may be possible to set which print server 1 is to be selected as the other print server from the plurality of selected print servers 1 according to the order of priority, to select at random, or the like.

With this configuration, even variable data 320 that requires a large amount of processing can be appropriately distributed.

Also, in the above-described embodiment, an example of allocating mainly the rasterization of variable printing has been described. However, print jobs and post-processing jobs can also be distributed by selecting the other print server as distribution destination. Also, distributed processing in units of records is also possible.

In these cases, different groups of print servers 1 may be used for selecting distribution destinations for the printing step and the post-processing step. Furthermore, both print jobs and post-processing jobs may be distributed.

By configuring in this way, it becomes possible to distribute and process print jobs and post-processing jobs more efficiently.

Also, in terms used in the present embodiment, the singular forms "a," "an," and "the" include plural forms unless the context clearly dictates otherwise.

Further, the configuration and operation of the above-described embodiment are examples, and needless to say, they can be modified and executed as appropriate without departing from the aim of the present disclosure.

What is claimed is:

1. An industrial printing system having a plurality of print servers and performing variable printing for production printing, each of the plurality of print servers comprising:
   a variable attribute generation unit configured to generate variable attribute information including content information of variable content for which a security level is set invariable data for variable printing;
   a security determination unit configured to select other print server capable of processing the variable content based on the security level of the content information of the variable attribute information generated by the variable attribute generation unit; and
   a processing management unit configured to request the other print server selected by the security determination unit to process the variable content according to the security level.

2. The industrial printing system according to claim 1, wherein:
the security determination unit selects the other print server when the security level is equal or lower than middle level that is lower than high level.

3. The industrial printing system according to claim 2, wherein:
the security determination unit designates dummy data to be used for the variable content in which the security level is high level at the time of prepress for the variable data.

4. The industrial printing system according to claim 2, wherein:
the content information of the variable content in which the security level is high level includes encrypted information, and
the processing management unit causes the other print server to process the variable content based on the encrypted information.

5. The industrial printing system according to claim 4, wherein:
the processing management unit transmits the content information to the other print server to request processing, acquires rasterized data generated by the other print server based on the content information and encrypted with the encrypted information, and performs rasterizing process by importing the rasterized data into the variable data.

6. A print server for an industrial printing system that performs variable printing for production printing, comprising:
a variable attribute generation unit configured to generate variable attribute information including content information of variable content for which a security level is set invariable data for variable printing;
a security determination unit configured to select other print server capable of processing the variable content based on the security level of the content information of the variable attribute information generated by the variable attribute generation unit; and
a processing management unit configured to request the other print server selected by the security determination unit to process the variable content according to the security level.

7. The print server according to claim 6, wherein:
the security determination unit selects the other print server when the security level is equal or lower than middle level that is lower than high level.

8. The print server according to claim 7, wherein:
the security determination unit designates dummy data to be used for the variable content in which the security level is high level at the time of prepress for the variable data.

9. The print server according to claim 7, wherein:
the content information of the variable content in which the security level is high level includes encrypted information, and
the processing management unit causes the other print server to process the variable content based on the encrypted information.

10. The print server according to claim 9, wherein:
the processing management unit transmits the content information to the other print server to request processing, acquires rasterized data generated by the other print server based on the content information and encrypted with the encrypted information, and performs rasterizing process by importing the rasterized data into the variable data.

11. A variable printing method performed by an industrial printing system comprising a plurality of print servers and performing variable printing for production printing, comprising the steps of:
generating variable attribute information including content information of variable content for which a security level is set in variable data for variable printing;
selecting other print server capable of processing the variable content based on the security level of the content information of the generated variable attribute information; and
requesting the selected other print server to process the variable content according to the security level.

12. The variable printing method according to claim 11, wherein:
selecting the other print server when the security level is equal or lower than middle level that is lower than high level.

13. The variable printing method according to claim 12, wherein:
designating dummy data to be used for the variable content in which the security level is high level at the time of prepress for the variable data.

14. The variable printing method according to claim 12, wherein:
the content information of the variable content in which the security level is high level includes encrypted information; and
causing the other print server to process the variable content based on the encrypted information.

15. The variable printing method according to claim 14, wherein:
transmitting the content information to the other print server to request processing, acquires rasterized data generated by the other print server based on the content information and encrypted with the encrypted information, and performs rasterizing process by importing the rasterized data into the variable data.

* * * * *